United States Patent
Barrow

[19]

[11] Patent Number: 6,032,824
[45] Date of Patent: Mar. 7, 2000

[54] SPILL-LESS WAVE BOWL

[76] Inventor: Mark E. Barrow, 9628 S. Red Oakes Pl., Highlands Ranch, Colo. 80126

[21] Appl. No.: 09/184,676

[22] Filed: Nov. 2, 1998

[51] Int. Cl.$^7$ .................................................. B65D 51/18
[52] U.S. Cl. .......................... 220/621; 220/625; 220/719; 220/731
[58] Field of Search .................................. 220/621, 625, 220/630, 719, 731

[56] References Cited

U.S. PATENT DOCUMENTS

| | | | |
|---|---|---|---|
| 1,453,824 | 5/1923 | Bauer | 220/625 |
| 2,143,027 | 1/1939 | Perry | 220/719 |
| 2,702,650 | 2/1955 | Botknecht | 220/625 |
| 3,781,164 | 12/1973 | McCaffery | 220/719 |
| 5,267,662 | 12/1993 | Hayes | 220/625 |
| 5,662,241 | 9/1997 | Sorensen | 220/630 |
| 5,758,797 | 6/1998 | Martindale | 220/719 |

*Primary Examiner*—Joseph M. Moy
*Attorney, Agent, or Firm*—Edwin H. Crabtree; Raman L. Pizavvo; Donald W. Mavgolis

[57] ABSTRACT

A spill-less wave bowl for use by pets and small children. The wave bowl is designed to prevent contents such as liquids in the bowl from spilling out over the edge of the bowl and from the bowl overturning. The spill-less wave bowl includes an inner bowl snapped to the inside of an outer shell. The inner bowl includes a bowl base in a lower portion of the bowl, sloping sides extending upwardly and outwardly from the bowl base and a circular bowl flange with snap arm disposed around an edge of an upper portion bowl. The outer shell includes a shell base in a lower portion of the shell, sloping sides extending upwardly and inwardly, an inwardly curved inverted concave-shaped lip which forms an interior concave-shaped cavity inside an upper portion of the shell. Around an inside of a center portion of the shell is a circular flange notch. The flange notch is used for receiving the snap arm of the bowl flange in a press fit for securing the inner bowl inside the shell base. When the wave bowl is hit or bumped, any liquid therein rides up against the inside of the inner bowl and into the interior concave-shaped cavity in the upper portion of the shell forming a wave which returns to the interior of the inner bowl. The forming of the wave inside the concave-shaped cavity prevents the liquid for spilling out of the spill-less wave bowl.

10 Claims, 1 Drawing Sheet

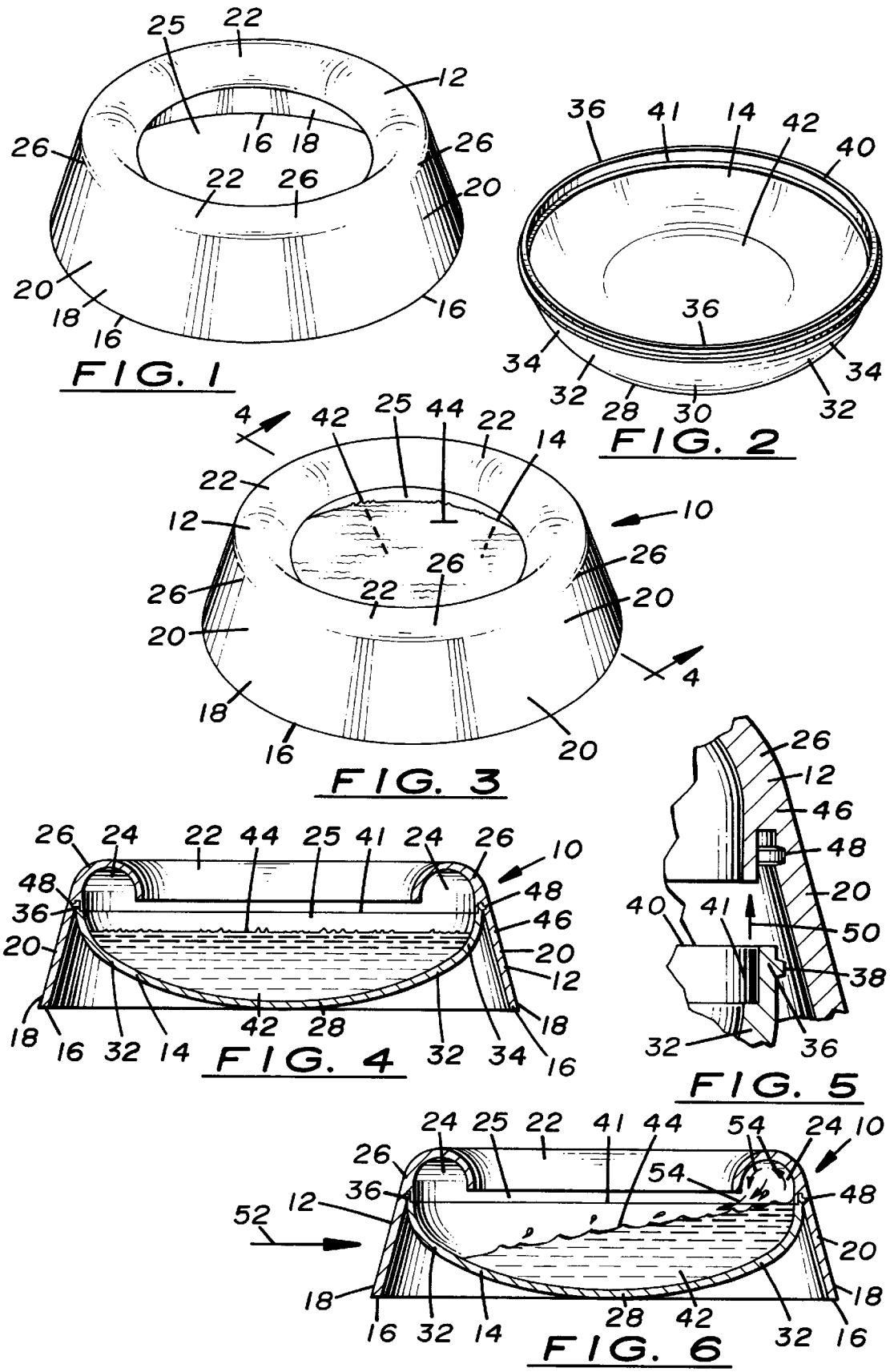

SPILL-LESS WAVE BOWL

BACKGROUND OF THE INVENTION (a) Field of the Invention

This invention relates to bowl construction and more particularly, but not by way of limitation, to a pet or small child bowl for holding liquids and food such as water, milk, cereal, etc. and reducing the spilling of the contents therein when the bowl is bumped or hit.

(b) Discussion of Prior Art

In U.S. Pat. No. 879,364 to Cohen and U.S. Pat. No. 2,294,657 to Flanagan a soup plate and a serving dish is disclosed which are designed to protect against the spilling of liquids on a table. Specifically the Cohen patent illustrates a downwardly extending flange or dike to help avoid spilling contents in the soup plate when carrying the plate on shipboard, etc.

In U.S. Pat. No. 5,297,504 to Carrico, a pet water saver is designed to be a spill-resistant container. The container includes an outer annular housing and an interior water dish. The annular housing includes a curved lip with aperture for returning water splashes back to the interior water dish. In U.S. Pat. No. 5,366,103 to Abernathy et al. and U.S. Pat. No. 5,105,769 to Smith et al., a spill-resistant bowl and an improved feeding device for animals are described for preventing spillage.

None of the above mentioned prior art prior art patents illustrate or described the unique features, structure and advantages of the subject spill-less wave bowl for use by pets and small children as described herein.

SUMMARY OF THE INVENTION

In view of the foregoing, it is a primary object of the subject invention to provide a bowl for holding liquids, semi-liquids and food items which will not spill outside the bowl when the bowl is hit, bumped, kicked, etc.

Another object of the invention is the bowl is designed to be used by pet owners for a pet's water, milk, etc. and used by small children when eating cereal and other food items to reduce and prevent spillage which heretofore was an ongoing problem.

Still another object of the invention is the spill-less bowl is designed with a broad base to prevent the bowl from tipping and overturning when bumped or hit.

Yet another object of the spill-less bowl is the bowl is attractive in design, simplistic and rugged in construction and may be used for holding a variety of different types of liquids and food products.

The subject invention includes an inner bowl snapped to the inside of an outer shell. The inner bowl includes a bowl base in a lower portion of the bowl, sloping sides extending upwardly and outwardly from the bowl base and a circular bowl flange with snap arm disposed around an edge of an upper portion bowl. The outer shell includes a shell base in a lower portion of the shell, sloping sides extending upwardly and inwardly, an inwardly curved inverted concave-shaped lip which forms an interior concave-shaped cavity inside an upper portion of the shell. Around an inside of a center portion of the shell is a circular flange notch. The flange notch is used for receiving the snap arm of the bowl flange in a press fit for securing the inner bowl inside the shell base. When the wave bowl is hit or bumped, any liquid therein rides up against the inside of the inner bowl and into the interior concave-shaped cavity in the upper portion of the shell forming a wave which returns to the interior of the inner bowl. The forming of the wave inside the concave-shaped cavity prevents the liquid for spilling out of the spill-less wave bowl.

These and other objects of the present invention will become apparent to those familiar with the different types of bowls, soup dishes, serving plates and liquid containers when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a perspective view of an outer shell which forms one part of the spill-less wave bowl shown in FIG. 3.

FIG. 2 is a perspective view of an inner bowl which forms another part of the spill-less bowl.

FIG. 3 is a perspective view of the subject invention illustrating the inner bowl received inside the outer shell and held therein in a press fit and forming the spill-less bowl.

FIG. 4 is a side sectional view of the spill-less bowl taken along lines 4—4 shown in FIG. 3. The spill-less bowl is shown with liquid such as water therein.

FIG. 5 is an enlarged sectional view of a portion of a circular bowl flange with snap arm positioned for receipt inside a circular flange notch in the inside of the outer shell.

FIG. 6 is a side sectional view of the spill-less bowl similar to FIG. 4 and with the bowl having been bumped and a wave formed inside a concave-shaped cavity in the inside of the outer shell for the liquid back into the inner bowl.

DESCRIPTION OF THE PREFERRED EMBODIMENTS

In FIG. 1, a perspective view of an outer shell 12 is illustrated. The outer shell 12 forms broadly one part of a spill-less wave bowl shown in FIG. 3. A second part of the bowl is an inner bowl 14 shown in FIG. 2. The spill-less bowl is designated by general reference numeral 10 in the drawings.

The outer shell 12 includes a circular shell base 16 in a lower portion 18 of the shell 12. Extending upwardly from the shell base 16 are sloping sides 20 extending upwardly and inwardly merging with a circular inwardly curved inverted concave-shaped lip 22. A large opening 25 is formed inside the concave-shaped lip 22 for receiving water and other liquids and food items inside the inner bowl 14. The concave-shaped lip 22 forms an interior concave-shaped cavity 24 inside an upper portion 26 of the shell 12. The cavity 24 is seen in FIGS. 4 and 6. It should be noted that by the design of the base 16 and the inwardly sloping sides 20, the outer shell 12 helps the spill-less bowl 10 from tipping and overturning when bumped or hit.

In FIG. 2, a perspective view of the inner bowl 14 is shown. The inner bowl 14 includes a bowl base 28 in a lower portion 30 of the bowl 14. Sloping sides 32 extend upwardly and outwardly from the bowl base 28. In an upper portion 34 of the bowl base 28 is a circular bowl flange 36 with a snap arm 38 disposed around an edge 40. A inner circular groove 41 is also disposed around the edge 40 and next to the flange 36. The flange 36 and snap arm 38 are shown in greater detail in FIG. 5. The inner bowl 14 also includes a large interior bowl portion 42 of receiving and holding liquids therein.

In FIG. 3, a perspective view of the subject spill-less bowl 10 is illustrated with the inner bowl 14 received inside the outer shell 12 and held therein in a press fit. In this view the inverted concave-shaped lip 22 is shown extending over and covering the upper portion 40 of the inner bowl 14.

In FIG. 4, a side sectional view of the spill-less bowl 10 is shown taken along lines 4—4 shown in FIG. 3. In this drawing, the inner bowl 14 is shown filled with a liquid 44 such as water therein. Around an inside of a center portion 46 of the shell 12 is a circular flange notch 48. The flange notch 48 is used for receiving the snap arm 38 of the bowl flange 36 in a press fit for securing the inner bowl 14 inside the shell base 16.

In FIG. 5, an enlarged sectional view of a portion of the circular bowl flange 36 is shown with the snap arm 38 positioned for receipt, as indicated by arrow 50, inside the circular flange notch 48 in the inside of the outer shell 12. While the snap arm 38 and bowl flange 36 are shown for engaging the flange notch 48 in the outer shell 12, it should be noted that any number of ways of securing the inner bowl to the inside of the outer shell can be used without departing from the spirit and scope of the invention.

In FIG. 6, a side sectional view of the spill-less bowl 10 is shown similar to FIG. 4. In this drawing, the bowl 10 has been bumped or hit as indicated by large arrow 52. The liquid 44 has moved from left to right inside the interior bowl portion 42 of the inner bowl 14. The liquid 44 in the right hand side of the inner bowl 14 has moved upwardly into the concave-shaped cavity 24 of the outer shell 12. When this occurs, a wave is formed as indicated by a plurality of arrows 54. By the nature of the wave 54, the liquid 44 is returned back inside the inner bowl 14 and there is no spillage outside the spill-less bowl 10.

While the invention has been shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A spill-less wave bowl for use by pets and small children, the wave bowl adapted for receiving a liquid therein and preventing the liquid from spilling therefrom, the wave bowl comprising:

a inner bowl having sloping sides extending upwardly and a circular edge around an upper portion of said inner bowl; and an outer shell having sloping sides extending upwardly and an inwardly curved inverted concave-shaped lip in an upper portion of said outer shell, the inwardly curved inverted concave-shaped lip forming an interior concave-shaped cavity inside the upper portion of said outer shell, said inner bowl received inside said outer shell and attached thereto.

2. The wave bowl as described in claim 1 wherein the circular edge of said inner bowl is attached to a portion of an inside of the sloping sides of said outer shell.

3. The wave bowl as described in claim 2 wherein the inverted concave-shaped lip extends over and covers an inside of the sloping sides of the inner bowl to prevent the liquid from escaping therefrom.

4. A spill-less wave bowl for use by pets and small children, the wave bowl adapted for receiving a liquid therein and preventing the liquid from spilling therefrom, the wave bowl comprising:

a inner bowl having a bowl base with sloping sides extending upwardly and outwardly from the bowl base and a circular edge around an upper portion bowl of said inner bowl; and an outer shell having a shell base with sloping sides extending upwardly and inwardly from the shell base and an inwardly curved inverted concave-shaped lip in an upper portion of said outer shell, the inwardly curved inverted concave-shaped lip forming an interior concave-shaped cavity inside the upper portion of said outer shell, said inner bowl received inside said outer shell and attached thereto.

5. The wave bowl as described in claim 4 wherein the circular edge of said inner bowl includes a flange with snap arm for engaging a portion of the inside of said outer shell.

6. The wave bowl as described in claim 5 wherein the inside of the outer shell includes a circular flange notch for receiving a portion of the flange and the snap arm of said inner bowl in a press fit.

7. The wave bowl as described in claim 4 wherein the inwardly curved inverted concave-shaped lip extends over and covers an inside of the sloping sides of said inner bowl to prevent the liquid from escaping therefrom.

8. A spill-less wave bowl for use by pets and small children, the wave bowl adapted for receiving a liquid therein and preventing the liquid from spilling therefrom, the wave bowl comprising:

a inner bowl having a bowl base with sloping sides extending upwardly and outwardly from the bowl base and a circular edge around an upper portion bowl of said inner bowl; and an outer shell having a shell base with sloping sides extending upwardly and inwardly from the shell base and an inwardly curved inverted concave-shaped lip in an upper portion of said outer shell, the inwardly curved inverted concave-shaped lip forming an interior concave-shaped cavity inside the upper portion of said outer shell and extending over and covering an inside of the sloping sides of said inner bowl to prevent the liquid from escaping therefrom, said inner bowl received inside said outer shell and attached thereto.

9. The wave bowl as described in claim 8 wherein the circular edge of said inner bowl includes a flange with snap arm for engaging a portion of the inside of said outer shell.

10. The wave bowl as described in claim 9 wherein the inside of said outer shell includes a circular flange notch for receiving a portion of the flange and the snap arm of said inner bowl in a press fit.

* * * * *